US012687150B1

(12) United States Patent
Caron

(10) Patent No.: US 12,687,150 B1
(45) Date of Patent: Jul. 21, 2026

(54) ENERGY RECOVERY DEVICE FOR EXHAUST SYSTEMS

(71) Applicant: Danielle Caron, Nashville, TN (US)

(72) Inventor: Danielle Caron, Nashville, TN (US)

( * ) Notice: Subject to any disclaimer, the term of this patent is extended or adjusted under 35 U.S.C. 154(b) by 0 days.

(21) Appl. No.: 18/786,443

(22) Filed: Jul. 27, 2024

(51) Int. Cl.
*F03D 3/00* (2006.01)
*H02K 7/18* (2006.01)

(52) U.S. Cl.
CPC ............. *F03D 3/005* (2013.01); *H02K 7/183* (2013.01); *F05B 2220/602* (2013.01); *F05B 2220/706* (2013.01)

(58) Field of Classification Search
CPC .... F03D 3/005; H02K 7/183; F05B 2220/602
See application file for complete search history.

(56) References Cited

U.S. PATENT DOCUMENTS

| | | | | |
|---|---|---|---|---|
| 1,697,574 | A | * | 1/1929 | Savonius ................ F03D 3/007 |
| | | | | 416/135 |
| 5,152,788 | A | | 10/1992 | Isaacson et al. |
| 6,365,985 | B1 | | 4/2002 | Cohen |
| 7,878,236 | B1 | | 2/2011 | Breen |
| 8,183,709 | B1 | | 5/2012 | Manning |
| 11,041,651 | B2 | | 6/2021 | ElSaadany |
| 11,371,103 | B2 | | 6/2022 | Stevens |
| 2009/0206611 | A1 | | 8/2009 | Gilbert |
| 2009/0267351 | A1 | | 10/2009 | Buns |
| 2011/0049893 | A1 | | 3/2011 | Saluccio |
| 2016/0065115 | A1 | * | 3/2016 | Pugina ................... H02S 10/12 |
| | | | | 307/72 |
| 2018/0045178 | A1 | * | 2/2018 | Bell .......................... F03D 3/04 |
| 2019/0353042 | A1 | * | 11/2019 | West ...................... F01D 5/303 |
| 2020/0370775 | A1 | * | 11/2020 | ElSaadany ............... F03D 9/25 |
| 2022/0042451 | A1 | * | 2/2022 | Stevens .................. F24F 12/00 |
| 2023/0092798 | A1 | | 3/2023 | Norton |

* cited by examiner

*Primary Examiner* — Sean Gugger
(74) *Attorney, Agent, or Firm* — Gugliotta & Gugliotta LPA

(57) ABSTRACT

An energy recovery device for exhaust systems is provided, comprising an attachable portion for connecting to natural gas appliance exhaust, a magnetized turbine optimized for hot gas ascent, a generator, an integrated carbon capture system, a power module for HVAC blower fans, and a battery storage system. This unique combination allows for easy integration with existing appliances, efficient power generation, emissions reduction, resilient HVAC operation, and practical power management. The device can be retrofitted to existing exhaust systems or integrated into new appliances. By recovering both kinetic and thermal energy from exhaust gases while reducing emissions, the invention significantly improves overall energy efficiency and environmental impact compared to prior art solutions.

12 Claims, 4 Drawing Sheets

10

20

40

55

35

45

50

60

60

60

45

35

45

15

ENERGY RECOVERY DEVICE FOR EXHAUST SYSTEMS

RELATED APPLICATIONS

There are no previously filed, nor currently any co-pending applications, anywhere in the world.

BACKGROUND OF THE INVENTION

1. Field of the Invention

The present invention relates generally to energy recovery systems and, more particularly, to an comprehensive energy recovery device that produces electricity from exhaust gases of natural gas-powered appliances while also reducing emissions and providing resilient power management.

2. Description of the Related Art

Heat-producing appliances, such as furnaces, boilers, heat pumps, water heaters, and space heaters that utilize natural gas, propane, or similar heating materials, generate exhaust gases as a byproduct of their operation. These exhaust gases typically contain both thermal energy and kinetic energy that is usually wasted by being released into the atmosphere.

With increasing focus on energy efficiency and environmental concerns, there is a growing need for systems that can recover and utilize this wasted energy. Combined Heat and Power (CHP) systems have been developed to address this need, but these systems are often complex and expensive, making them impractical for widespread residential or small commercial use.

Therefore, a need exists for a simple, cost-effective device that can be easily installed on existing heat-producing appliances to recover energy from exhaust gases and convert it into usable electricity. The present invention addresses this need by providing an energy recovery device that can be retrofitted to existing exhaust systems or incorporated into new appliances.

Various attempts have been made to generate power from HVAC or exhaust systems using turbines. For example, Cohen, Berenda, Buns, Saluccio, and ElSaadany have discussed related concepts. However, these prior art solutions typically focus on single aspects of energy recovery or emissions reduction, failing to provide a comprehensive system that addresses energy generation, emissions reduction, and practical power management in an easily integratable package.

SUMMARY OF THE INVENTION

It is thus an object of the present invention to provide an energy recovery device that can be easily installed on existing exhaust systems of heat-producing appliances.

It is a further object of the present invention to provide an energy recovery device that converts both thermal and kinetic energy from exhaust gases into electrical energy.

It is still a further object of the present invention to provide an energy recovery device that includes carbon capture capabilities to reduce pollutants in exhaust gases.

The present invention provides a comprehensive energy recovery device for exhaust systems that uniquely combines an attachable portion for natural gas device exhaust, a magnetized turbine designed for hot gas ascent, integrated carbon capture, powering of HVAC blower fans, and excess power battery storage. This combination of features provides a system for easy integration, emissions reduction, resilient HVAC operation, and practical power management. In preferred embodiments, the inventive device includes: a generator housing mounted atop an exhaust stack; a generator within the housing connected to a central shaft; vertical wind turbines attached to the central shaft within the exhaust stack; thermocouples for converting thermal energy to electrical energy; a starter motor to initiate rotation of the turbines and generator; and a power module for managing the generated electrical power. Optionally, the device may include carbon capture material within the exhaust stack to reduce pollutants.

It is an advantage of the present invention that it produces electrical power from both the motion and heat of exhaust gases.

It is another advantage of the present invention that it can be easily retrofitted to existing exhaust systems of heat-producing appliances.

It is an advantage of the present invention that it stores excess electrical power until needed, improving overall energy efficiency.

It is another advantage of the present invention that it removes pollutants from exhaust gases, reducing environmental impact.

It is an advantage of the present invention that it is protected from the elements, ensuring durability and longevity.

It is another advantage of the present invention that it measures energy output, allowing users to track their energy recovery.

It is an advantage of the present invention that it provides a "green" product for energy-conscious users, contributing to sustainability efforts.

It is another advantage of the present invention that it can be integrated into new appliances as a standard component, promoting widespread adoption.

It is an advantage of the present invention that it converts a heat-only appliance into a combined heat and power (CHP) device, increasing overall energy efficiency.

It is another advantage of the present invention that it can potentially reduce electrical utility bills by generating supplementary power.

It is an advantage of the present invention that it requires little to no training for users to operate, ensuring ease of use.

It is another advantage of the present invention that it can be adapted for various sizes and types of heat-producing appliances, offering versatility in application.

It is an advantage of the present invention that it provides a comprehensive system for easy integration with existing appliances, emissions reduction, resilient HVAC operation, and practical power management.

Further objects, features, and advantages of the invention will become apparent in the course of the following description.

BRIEF DESCRIPTION OF THE FIGURES

The advantages and features of the present invention will become better understood with reference to the following more detailed description and claims taken in conjunction with the accompanying drawings, in which like elements are identified with like symbols, and in which:

DETAILED DESCRIPTION OF THE PREFERRED EMBODIMENTS

The best mode for carrying out the invention is presented in terms of its preferred embodiment, herein depicted within the Figures. It should be understood that the legal scope of the description is defined by the words of the claims set forth at the end of this patent and that the detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f).

The best mode for carrying out the invention is presented in terms of its preferred embodiment, herein depicted within the Figures.

1. Detailed Description of the Figures

Figure 1:
FIG. 1 is a perspective view of the energy recovery device 10, according to the preferred embodiment of the present invention.
Figure 1:
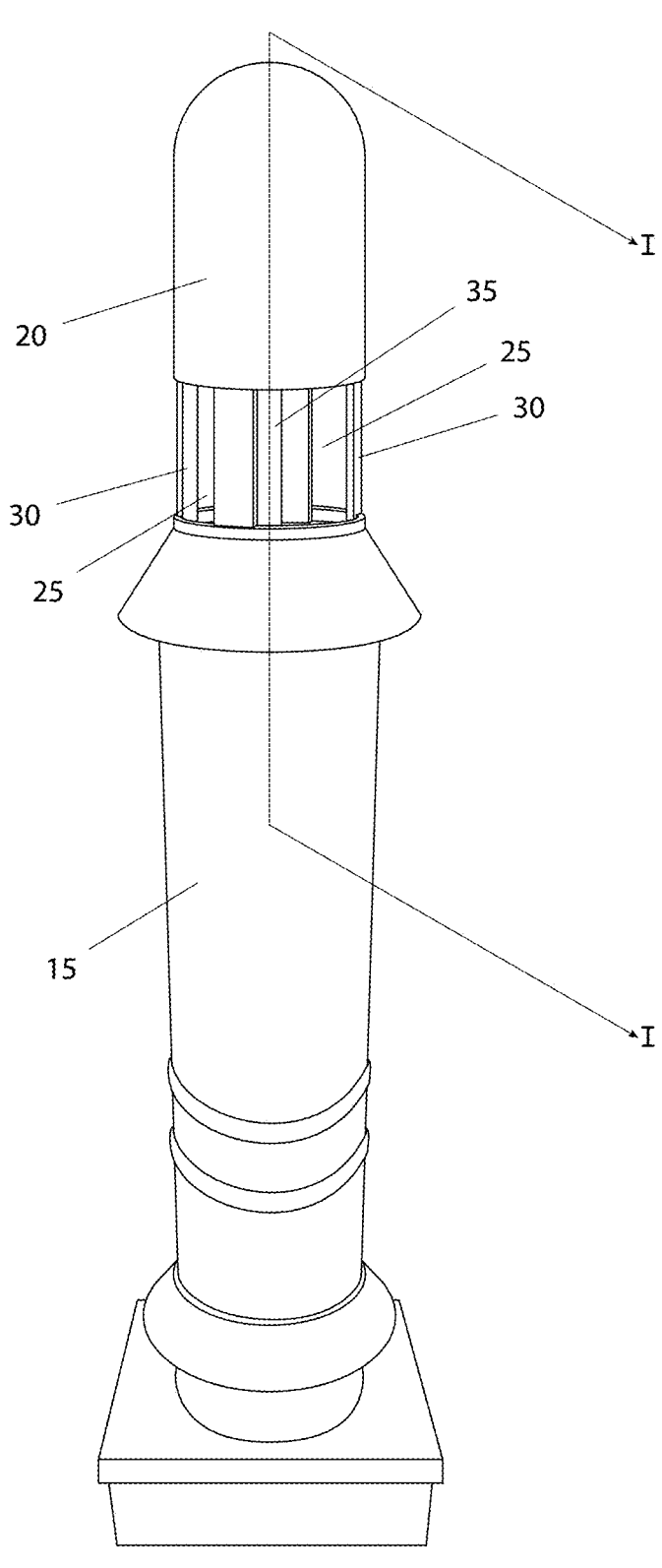

Referring now to the drawings, wherein like reference numerals indicate the same parts throughout the several views, an energy recovery device, generally noted as 10, is shown according to the preferred embodiment of the present invention. Referring now to FIG. 1, the energy recovery device (herein also described as the "device") 10, produces electricity that is powered from the exhaust piping 80 of a natural gas-powered appliance 65. The present invention is designed to be attached to existing heating appliances 65 such as furnaces, boilers, heat pumps, water heaters, space heaters and the like that utilize natural gas, propane or similar heating materials. The device 10 sits atop an exhaust stack 15, also known as a chimney or flue. The device 10 provides for a generator housing 20 at the very top, with exhaust openings 25 located underneath, as supported by multiple standoffs 30 that attach the generator housing 20 to the exhaust stack 15. The generator housing 20 is envisioned to be weatherproof, so as to provide environmental protection for the components contained within. A central shaft 35, is visible along the central axis of the exhaust stack 15, and its functionality will be described in greater detail herein below. The teachings of the device 10 will have applications in the residential, commercial, institutional, and commercial environments. As such, the physical size, mechanical specifications, and electrical ratings of the device 10 will vary dependent on the applications. Accordingly, the use of the device 10 in any specific usage scenario is not intended to be a limiting factor of the present invention.

Figure 2:
FIG. 2 is a sectional view of the energy recovery device 10, as seen along a line I-I, as shown in FIG. 1, according to the preferred embodiment of the present invention.
Figure 2:
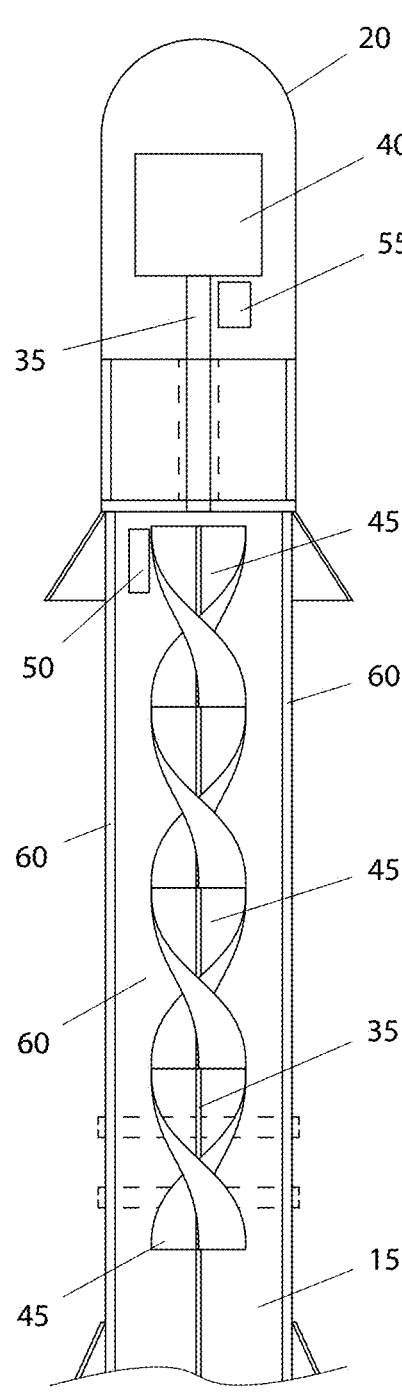

Referring next to FIG. 2, a sectional view of the device 10 as seen along a line I-I, as shown in FIG. 1 according to the preferred embodiment of the present invention, is depicted. A generator 40 is provided on the interior of the generator housing 20 at the uppermost portion of the device 10. The central shaft 35, common to the main shaft of the generator 40 extends downward into the exhaust stack 15. The generator 40 is of a high-efficiency, low-resistance style that easily rotates under the most minimal of rotational pressure. A plurality of vertical wind turbines 45 are attached to the central shaft 35. The vertical wind turbines 45 are envisioned to be of the Savonius, Darrieus, H-rotor, Giromill, Helix, Windspire, Turby, Twisted Savonius, Crossflex, Quietrevolution, or Aerotecture type. The use of any particular type of vertical wind turbine 45 is not intended to be a limiting factor of the present invention.

The device 10 may also include one (1) or more thermocouple 50, as an additional method of converting the heat within the exhaust stack 15 into electricity. Further detail on the thermocouples 50 will be provided below. During initial operation of the device 10, the vertical wind turbines 45 as well as the generator 40 on the central shaft 35, may require assistance in beginning to rotate. To aid in this effort, the device 10 is provided with a starter motor 55. Power to operate the starter motor 55 will be supplied by the generator 40 and any thermocouples 50, if so provided, and will be described in greater detail herein below. In an effort to reduce pollution, the device 10 may be provided as a lining on the interior of the exhaust stack 15. It is envisioned that the carbon capture material 60 would be easily replaceable after a certain amount of time, such as in a multi-month interval, in an effort to reduce cost and maintenance.

Figure 3:
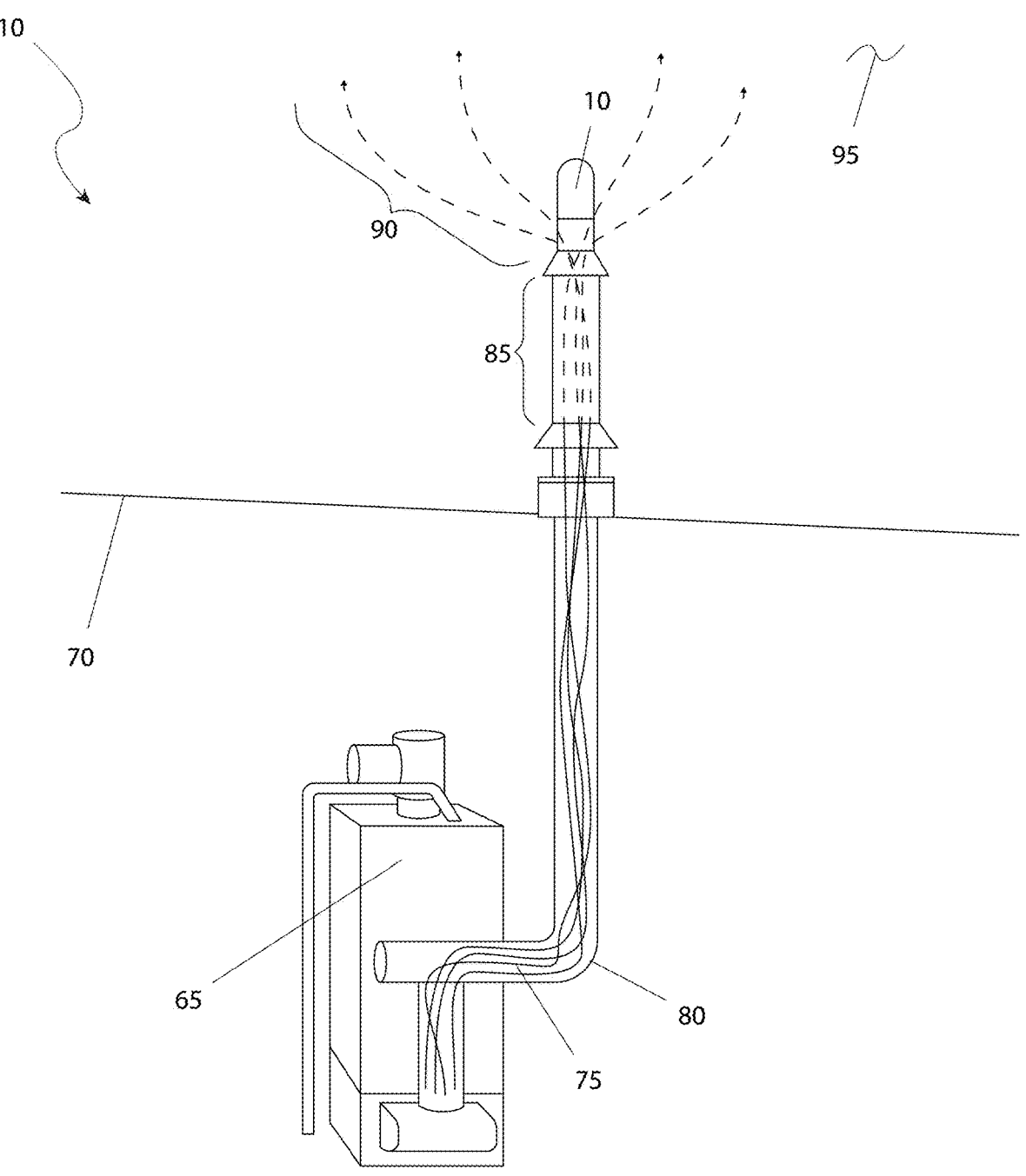
FIG. 3 is a perspective view of the energy recovery device 10, shown in an installed state, according to the preferred embodiment of the present invention; and, FIG. 4 is an electrical block diagram of the energy recovery device 10, according to the preferred embodiment of the present invention. At least one specification heading is required.

Referring now to FIG. 3, a perspective view of the device 10 shown in an installed state according to the preferred embodiment of the present invention, is shown. The device 10 is installed upon an exhaust stack 15 that is connected to a gas-fired, heat-producing appliance 65. As is commonly expected, the exhaust stack 15 is located atop the roof 70 of a home, building, or other structure. Exhaust gas 75 leaves the appliance 65, as contained within exhaust piping 80. As the exhaust gas 75 passes through the exhaust stack 15, the carbon capture material 60 (as shown in FIG. 2) removes carbon dioxide (CO2), resulting in partially treated exhaust gas 85 as it progresses through the exhaust stack 15, and results in fully treated exhaust gas 90 that is released to the atmosphere 95. As the partially treated exhaust gas 85 moves upward, the vertical wind turbines 45, and thus the central shaft 35, and subsequently the generator 40, (all of which are shown in FIG. 2) will spin thus producing electrical power. Operation of the device 10 is based on the concept of combined heat and power (CHP) systems. CHP systems are those that use a fuel, or a prime mover, to produce heat, while also producing electricity, as a by-product of the heat production. As such, usage of the device 10 converts a heat-only appliance 65 into a CHP device which also produces electrical power. The usage of the device 10 may be provided as a standard component of a new or replacement appliance 65 or may be provided as an add-on aftermarket kit for existing appliance 65.

Figure 4:
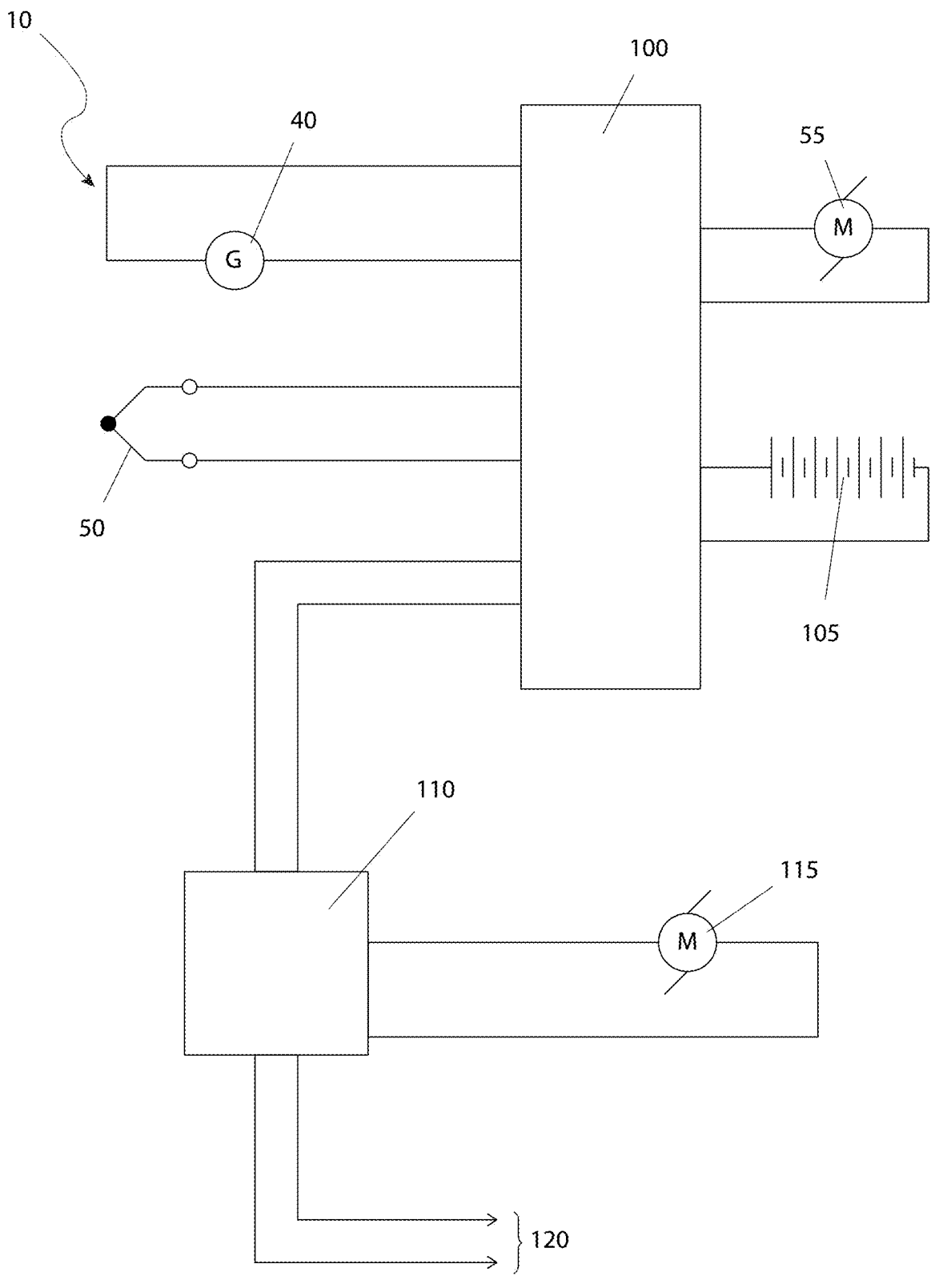

Referring to FIG. 4, an electrical block diagram of the device 10 according to the preferred embodiment of the present invention, is disclosed. Both the generator 40 and the thermocouples 50 provide electrical power as an input to power module 100. Power output from the power module 100 is used to charge a battery 105 and to operate the starter motor 55. The usage of the battery 105 allows all excess power from the inverter 110 to be captured, even at times when there are no other uses for it. Power is also sent to a power module 100 which provides alternating current (AC) power to a fan motor 115 as provided on the appliance 65 (if present) such as in the case of a central forced air furnace or the like. AC power may also be provided for other AC loads 120 such as other users of power or fed back into the grid to reduce total electrical usage and subsequently reduce electrical utility bills.

The device 10 includes an attachable portion designed to easily connect to the exhaust of existing natural gas-powered appliances. This attachable portion is engineered to ensure a secure fit and proper channeling of exhaust gases into the energy recovery system without compromising the appliance's original function or safety features.

The vertical wind turbines 45 in the present invention incorporate a unique magnetized design optimized for capturing energy from ascending hot gases. This design utilizes the principles of magnetization to enhance the efficiency of energy capture and conversion, allowing for continuous power generation even under variable exhaust flow conditions.

The carbon capture material 60 is integrated directly into the exhaust flow path, providing real-time emissions reduction as the device operates. This integration ensures that the device not only generates power but also actively contributes to reducing the environmental impact of the appliance it's attached to.

The power module 100 is specifically configured to supply power to the HVAC system's blower fan. This direct connection ensures that critical heating and cooling functions can continue even during power outages, enhancing the resilience of the overall system.

The battery 105 serves as more than just a simple power storage unit. It is part of an intelligent power management system that stores excess generated power for use during peak demand periods or power outages. This system enhances the overall efficiency and utility of the device, ensuring that no generated power goes to waste.

2. Operation of the Preferred Embodiment

The preferred embodiment of the present invention can be utilized by the common user in a simple and effortless manner with little or no training. It is envisioned that the device 10 would be constructed in general accordance with FIG. 1 through FIG. 4. The user would procure the device 10 from conventional procurement channels such as mechanical equipment supply houses, home improvement stores, mail order and internet supply houses and the like. Special attention would be paid to the overall physical size of the device 10 such that it matches the size of the exhaust stack 15, as well as any mechanical and electrical specifications.

After procurement and prior to utilization, the generator housing 20 with the standoffs 30 would be connected to the exhaust stack 15 using appropriate fasteners. Mechanical and electrical connections would be made to the generator 40, the thermocouples 50, the starter motor 55, the power module 100, the battery 105, the inverter 110, the fan motor 115 and any AC loads 120. The carbon capture material 60, if used would also be installed. At this point in time, the device 10 is ready for use.

During utilization of the device 10, operation of the appliance 65 would commence in a typical and transparent manner. As the exhaust gas 75 leaves the appliance 65, it passes by the carbon capture material 60 to reduce carbon dioxide ($CO_2$) and result in fully treated exhaust gas 90 that is released to the atmosphere 95. Heat from the exhaust gas 75 is used to heat the thermocouples 50 to produce electrical power. The exhaust gas 75 also spin the vertical wind turbines 45 on the common central shaft 35 with the generator 40, thus producing electrical power as well. The resultant power is then used to operate the starter motor 55, charge the battery 105 and power any fan motor 115 and AC loads 120 through the inverter 110. Any electrical output parameters can be managed by a Building Management System (BMS) if desired.

The features of the present invention are envisioned to provide the following benefits: it produces electrical power from exhaust gas motion and heat; it stores electrical power until needed; it removes pollutants from exhaust gas 75; it is protected from the elements; it measures energy output; and, it provides a "green" product for energy conscious users.

The foregoing descriptions of specific embodiments of the present invention are presented for purposes of illustration and description. The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but is to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way. Any unintended embracement of such subject matter is hereby disclaimed. They are not intended to be exhaustive nor to limit the invention to precise forms disclosed and, obviously, many modifications and variations are possible in light of the above teaching. The embodiments are chosen and described in order to best explain principles of the invention and its practical application, to thereby enable others skilled in the art to best utilize the invention and its various embodiments with various modifications as are suited to the particular use contemplated. It is intended that a scope of the invention be defined broadly by the Drawings and Specification appended hereto and to their equivalents. Therefore, the scope of the invention is in no way to be limited only by any adverse inference under the rulings of Warner-Jenkinson Company, v. Hilton Davis Chemical, 520 US 17 (1997) or Festo Corp. v. Shoketsu Kinzoku Kogyo Kabushiki Co., 535 U.S. 722 (2002), or other similar caselaw or subsequent precedent should not be made if any future claims are added or amended subsequent to this Patent Application. At least one specification heading is required.

What is claimed is:

1. An energy recovery device for exhaust systems of an existing building, comprising:

an attachable portion configured to connect to an exhaust of a natural gas-powered HVAC system;

a vertical wind turbine comprising magnetized turbine blades arranged in a multipolar configuration to enable direct-drive power generation, wherein said magnetized blades are made of conductive material suitable for electricity generation, said blades arranged to capture kinetic energy from ascending hot exhaust gases while functioning as part of a generator system that eliminates the need for mechanical gearboxes and provide efficient electrical output at low rotational speeds characteristic of variable thermal exhaust flow conditions;

a thermocouple mounted positioned within the exhaust duct on a non-rotating structural support comprising a generator housing and in thermal contact with ascending hot exhaust gases, said thermocouple configured for converting heat within the exhaust duct into electrical energy, thereby enabling thermal energy capture independently of the turbine's kinetic energy capture, wherein the turbine blades are made of conductive, metal material and are free to rotate while collecting both thermal and kinetic energy;

a carbon capture material disposed within the exhaust flow path and arranged surrounding the generator housing, wherein said carbon capture material comprises a porous structure selected from porous carbons, metal-organic frameworks, or porous organic polymers, said porous structure configured to capture emissions from said ascending hot exhaust gases, said carbon capture material being removable and replaceable;

a generator within a housing mechanically connected to said vertical wind turbine, wherein the housing is positioned above the thermocouple and provides environmental protection to the thermocouple;

a power module electrically coupled to an existing HVAC supply blower fan of said existing HVAC system, said power module being configured to supply power to the HVAC system's blower fan during power outages;

a battery storage system electrically coupled to the generator and a power management system configured to store excess generated power; and a power management system electrically coupled to an electrical grid and configured to communicate with the electrical grid;

wherein said energy recovery device is configured to be retrofitted to said existing HVAC system to form a split combined heat and power (CHP) system without replacement of said existing HVAC system.

2. The energy recovery device of claim 1, wherein the carbon capture material includes a thermal insulative jacket to maintain operational temperature and prevent condensation from degrading carbon capture efficacy.

3. The energy recovery device of claim 1, wherein said vertical wind turbine comprises a Savonius-type rotor formed of two oppositely curved vanes overlapping at the center to form an S-shaped channel of substantially constant area, configured to initiate rotation from stationary conditions in low-flow vertical exhaust streams and maintain stable torque under turbulent or fluctuating gas flow condition.

4. The energy recovery device of claim 1, further comprising a dual-mode inverter configured to supply either 120V or 240V AC output, selectable based on downstream load requirements for converting generated power to alternating current.

5. The energy recovery device of claim 1, wherein said attachable portion is configured to connect to an exhaust of a heat-producing appliance comprising at least one of a furnace, boiler, water heater, or space heater.

6. The energy recovery device of claim 1, wherein said vertical wind turbine comprises a generator having magnetic elements arranged in a multipolar direct-drive configuration to capture energy from ascending hot gases within the exhaust duct.

7. The energy recovery device of claim 1, wherein said carbon capture system is integrated within the exhaust flow path to provide real-time emissions reduction.

8. The energy recovery device of claim 1, wherein said power module is configured to prioritize power supply to the HVAC blower fan during power outages.

9. The energy recovery device of claim 1, wherein said battery storage system includes an intelligent power management system for optimizing power storage and distribution.

10. The energy recovery device of claim 1, further comprising:

a protective casing comprising a weatherproof generator housing with multiple standoffs that attach the generator housing to the exhaust duct, said protective casing configured to shield the vertical wind turbine and electrical components from environmental elements; and wherein said the generator housing is located above the thermocouple and the generator housing acts as a protective structure to the thermocouple, while the thermocouple is in direct contact with the ascending hot gases.

11. A method of retrofitting an existing building with an energy recovery system, comprising:

performing an initial building assessment comprising:

identifying combustion-producing equipment with exhaust ducts comprising at least of a furnace, boiler, water heater, or space heater that utilize natural gas or propane; and determining device sizing by matching a physical size of the energy recovery device to a size of the exhaust;

installing an energy recovery device in an exhaust duct of an existing natural gas-powered HVAC system, said energy recovery device comprising:

a vertical wind turbine arranged to capture kinetic energy from ascending hot exhaust gases;

a thermoelectric mechanism positioned within the exhaust duct and configured to convert heat from said ascending hot exhaust gases into electrical energy independently of said vertical wind turbine;

a carbon capture material disposed within the exhaust flow path, said carbon capture material comprising a porous structure selected from porous carbons, metal-organic frameworks, or porous organic polymers, said carbon material being removable and replaceable;

a generator coupled to said vertical wind turbine; and a power module connecting to an existing HVAC supply blower fan;

installing a battery storage system electrically coupled to the generator for storing excess generated power; and configuring a power management system electrically coupled to an electrical grid to optimize energy storage and communicate with an electrical grid;

wherein said energy recovery device forms a split combined heat and power (CHP) system with the existing natural gas-powered HVAC system.

12. A split combined heat and power (CHP) system for existing buildings, comprising:

an existing natural gas-powered HVAC system having heat-producing components and an exhaust duct; and a retrofitted power generation comprising:

a vertical wind turbine mounted in said exhaust duct, said turbine having blades made of conductive metal material and attached to a central shaft, said turbine having magnetic elements arranged in a mulitpolar configuration to capture kinetic energy from ascending hot exhaust gases;

a thermocouple positioned within the exhaust duct on a non-rotating structural support and configured to convert heat from said ascending hot exhaust gases into electrical energy;

a carbon capture material disposed within the exhaust flow path, said carbon capture material comprising a porous structure selected from porous carbons, metal-organic frameworks, or porous organic polymers, said carbon capture material being removable and replaceable;

a generator coupled to said vertical wind turbine;

a power module electrically connected to an existing HVAC supply blower fan;

a battery storage system electrically coupled to the generator; and a power management system electrically coupled to an electrical grid and configured to optimize energy storage and communicate with the electrical grid;

wherein said power generation module is configured to be installed separately from said existing HVAC system to form an integrated split CHP system.

\*   \*   \*   \*   \*